(12) United States Patent
Zelmer et al.

(10) Patent No.: US 7,360,795 B2
(45) Date of Patent: Apr. 22, 2008

(54) TORSION BAR LOAD LIMITER AND PRETENSIONER FOR SEAT BELT SYSTEM

(75) Inventors: Thomas Zelmer, Pontiac, MI (US); Jon E. Burrow, Ortonville, MI (US)

(73) Assignee: Autoliv ASP, Inc., Ogden, UT (US)

( * ) Notice: Subject to any disclaimer, the term of this patent is extended or adjusted under 35 U.S.C. 154(b) by 285 days.

(21) Appl. No.: 11/192,212

(22) Filed: Jul. 28, 2005

(65) Prior Publication Data

US 2007/0024045 A1    Feb. 1, 2007

(51) Int. Cl.
*B60R 22/46* (2006.01)

(52) U.S. Cl. ............... 280/806; 280/807; 297/478; 242/374

(58) Field of Classification Search ........... 280/806, 280/807; 297/478; 180/268; 242/374, 379.1, 242/390.8, 390.9
See application file for complete search history.

(56) References Cited

U.S. PATENT DOCUMENTS

| | | | |
|---|---|---|---|
| 4,247,422 A | 1/1981 | Davies | |
| 5,180,559 A | 1/1993 | Ma | |
| 5,344,095 A | 9/1994 | Frei | |
| 5,465,574 A | 11/1995 | Ma | |
| 5,522,564 A | 6/1996 | Schmidt et al. | |
| 5,526,996 A | 6/1996 | Ebner et al. | |
| 5,547,143 A | 8/1996 | Miller, III et al. | |
| 5,701,737 A | 12/1997 | Branik et al. | |
| 5,724,735 A | 3/1998 | Ickes et al. | |
| 5,820,058 A | 10/1998 | Hirzel et al. | |
| 5,938,135 A | 8/1999 | Sasaki et al. | |
| 5,980,837 A | 11/1999 | Umin et al. | |
| 6,012,667 A | 1/2000 | Clancy, III et al. | |
| 6,105,893 A | 8/2000 | Schmidt et al. | |
| 6,105,894 A | 8/2000 | Singer et al. | |
| 6,241,172 B1 | 6/2001 | Fugel et al. | |
| 6,267,314 B1 | 7/2001 | Singer et al. | |
| 6,293,010 B1 | 9/2001 | Umin et al. | |
| 6,324,758 B1 | 12/2001 | Huang et al. | |
| 6,332,273 B1 | 12/2001 | Huang et al. | |
| 6,364,238 B1 | 4/2002 | Weller | |
| 6,592,064 B2 | 7/2003 | Clute et al. | |
| 6,616,081 B1 | 9/2003 | Clute et al. | |
| 6,616,186 B1 | 9/2003 | Midorikawa et al. | |
| 6,626,463 B1 | 9/2003 | Arima et al. | |
| 6,659,505 B1 | 12/2003 | Knox | |
| 6,659,549 B1 | 12/2003 | Still et al. | |
| 6,701,617 B2 | 3/2004 | Li et al. | |
| 6,719,325 B2 | 4/2004 | Ingemarsson | |
| 6,726,250 B2 | 4/2004 | Ennerdal | |
| 6,729,649 B1 | 5/2004 | Schmidt | |
| 6,729,693 B2 | 5/2004 | Soderstrom et al. | |

(Continued)

*Primary Examiner*—Paul N. Dickson
*Assistant Examiner*—Robert A. Coker
(74) *Attorney, Agent, or Firm*—Sally J Brown; Brinks Hofer Gilson & Lione

(57) ABSTRACT

An anchorage device for a motor vehicle is provided, including a pretensioning wheel, a pulley connected to the pretensioning wheel via a torsion bar first portion, a seat belt connecting member connected to the pulley, and a locking device coupled with the pulley via a torsion bar second portion. The torsion bar first portion provides resistance to rotation of the pulley during outward locking travel of the seat belt connecting member.

26 Claims, 11 Drawing Sheets

U.S. PATENT DOCUMENTS

| | | |
|---|---|---|
| 6,732,429 B2 | 5/2004 | Houliang et al. |
| 6,749,225 B1 | 6/2004 | Clute et al. |
| 6,848,644 B2 * | 2/2005 | Eberle et al. ............ 242/390.8 |
| 2002/0166914 A1 | 11/2002 | Specht |
| 2003/0122020 A1 * | 7/2003 | Tanji .......................... 242/374 |
| 2003/0230883 A1 | 12/2003 | Heym |
| 2004/0183288 A1 | 9/2004 | Aygun et al. |
| 2005/0061904 A1 * | 3/2005 | Inuzuka et al. .......... 242/379.1 |
| 2006/0131456 A1 * | 6/2006 | Romero ...................... 242/382 |
| 2006/0273210 A1 * | 12/2006 | Clute et al. ................. 242/374 |

* cited by examiner ively restrain the occupant during an impact. The tensioning member, pretensioner and pulley. By providing the

TORSION BAR LOAD LIMITER AND PRETENSIONER FOR SEAT BELT SYSTEM

BACKGROUND

1. Field of the Invention

The present invention relates to systems and methods for adjusting seat belt tension of motor vehicle safety systems. More specifically, the invention relates to an anchorage device including a pretensioner for reducing slack in the seat belt prior to and during a vehicle impact.

2. Related Technology

Seat belt restraint systems for automobiles often include a pretensioner as part of a seat belt retractor which applies tension to the seat belt when a vehicle impact or a potential vehicle impact is detected. When activated, the pretensioner eliminates slack in the seat belt, and thus controls the physical space between the occupant and the seat belt. In this manner, less slack is present in the seat belt, thereby controllably restraining the occupant, reducing occupant movement, and controlling loads when the occupant moves forwardly into engagement with the seat belt.

During an impact condition, the vehicle occupant is urged in a forward direction against the seat belt which absorbs energy; potentially causing an undesirable seat belt pay-out. After the pretensioner reduces slack, a locking mechanism is activated to reduce or prevent free webbing pay-out. However, before accomplishing the complete locking, the combination of the pretensioner and the locking mechanism typically allow the belt to travel freely and pay-out a small length of seat belt webbing, a phenomenon commonly known in the art as "locking dip". Locking dip reduces the degree of coupling between the occupant and the vehicle, which in turn reduces the amount of energy that can be absorbed by the seat belt system during a crash. This leads to higher peak belt forces and higher accelerations experienced by the occupant.

Although current seat belt systems include a pretensioner as part of the seat belt retractor, this configuration may be undesirable for some vehicle designs. For example, the seat belt retractor may not be able to accommodate the pretensioner due to space constraints. Additionally, the location of the retractor within the vehicle seat may be such that the retractor is not conducive to being coupled with a pretensioner. More specifically, the retractor may be mounted in a location that renders maintenance on the pretensioner inconvenient or impractical. Furthermore, due to the presence of several moving components within the seat belt retractor, it may be undesirable to include additional components, such as a pretensioner, that would further increase the complexity of the system.

While current pretensioning devices and methods for pretensioning a vehicle seat belt achieve their intended purpose, many enhancements and additional features are needed. Therefore, a new and improved pretensioning system and method for reducing locking dip would be desirable.

SUMMARY

In overcoming the limitations and drawbacks of the prior art, the present invention provides an anchorage device having a pretensioning wheel, a pulley connected to the pretensioning wheel via a torsion bar first portion, a seat belt connecting member connected to the pulley, and a locking device coupled with the pulley via a torsion bar second portion. The design configuration reduces the locking dip discussed above by preventing free pay-out of the seat belt during a vehicle impact.

In a preferred design, the torsion bar is a single, unitary component. In one design, the seat belt connecting member is wire cable connected to a seat belt anchor. In another design, the seat belt connecting member is a wire cable connected to a seat belt buckle.

In another design in accordance with this invention, the locking device includes a ratcheting element configured to permit the rotation of the locking device in a first direction and to prevent the rotation of the locking device in a second direction. For example, the ratcheting device has a disengaged position to permit the rotation of the locking device in the first direction and an engaged position to prevent the rotation of the locking device in the second direction.

Additionally, the locking device may include an electric motor, a worm, and a worm gear coupling the electric motor and the locking device with each other.

In another aspect of the present invention, the anchorage device includes a pulley coupled with a seat belt connecting member, a first load limiting component to prevent a predetermined maximum first torque between the pretensioning wheel and the pulley, a locking device including a locking portion configured to selectively prevent rotation of the locking device, and a second load limiting component to prevent a predetermined maximum second torque between the locking device and the pulley.

In yet another aspect of the present invention, a method of tensioning the vehicle seat belt includes applying a rotational force to the pretensioning wheel during a first stage of an impact event to retract the seat belt connecting member and providing resistance to rotation of the pulley via the first portion of the torsion bar during a second stage of the event. The step of providing resistance to the rotation of the pulley reduces locking dip by preventing free pay-out of the seat belt during the vehicle impact.

Further objects, features and advantages of this invention will become readily apparent to persons skilled in the art after a review of the following description, with reference to the drawings and claims that are appended to and form a part of this specification.

DETAILED DESCRIPTION

Figure 1:
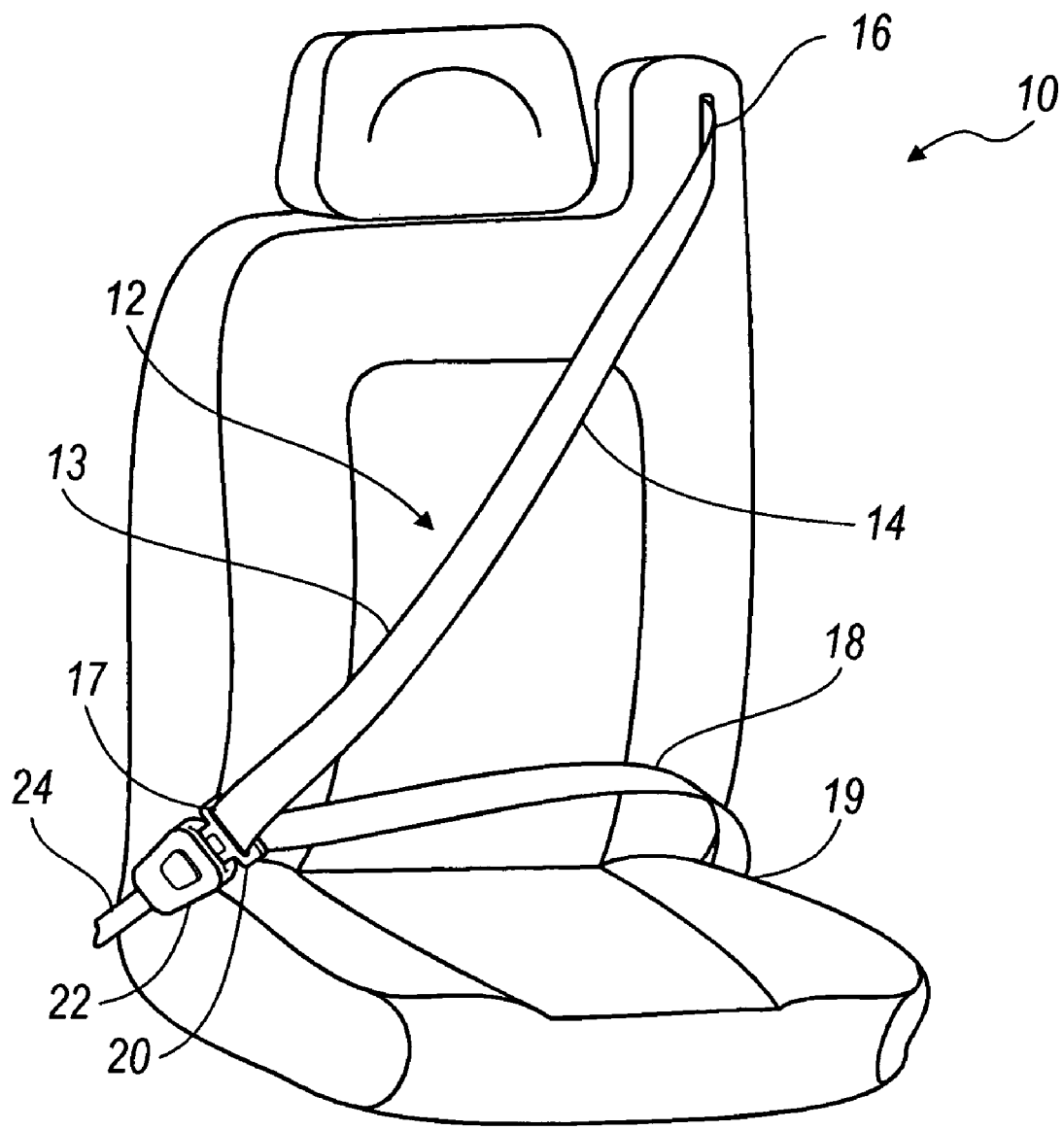
FIG. 1 is a perspective view of a vehicle seat and a seat belt assembly coupled with each other.

Referring now to the drawings, FIG. 1 shows a vehicle seat 10 and a seat belt assembly 12. The seat belt assembly 12 includes a seat belt webbing 13 having a shoulder belt portion 14 extending from an upper anchorage 16 to a buckle loop 17 and a lap belt portion 18 extending from the buckle loop 17 to an anchor point 19. A buckle latch plate 20 is able to be inserted into a seat belt buckle 22 to lock and unlock the seat belt assembly 12. A seat belt buckle cable 24, either directly or in cooperation with other components, secures the seat belt buckle 22 to a portion of the vehicle frame. The seat belt webbing 13 is able to pay-out from a retractor (not shown), which is located within the vehicle seat 10 (in an integrated structural seat design) or is coupled with a fixed point of the vehicle body, so that the effective length of the seat belt webbing 13 is adjustable. When the buckle latch plate 20 has been inserted into the seat belt buckle 22, the seat belt assembly 12 defines a three-point contact between the upper anchorage 16, the buckle latch plate 20, and the anchor point 19. Any other suitable configurations, such as alternative locations for the retractor, the buckle latch plate 20, and the anchor point 19, may be used with the present invention.

During normal operation of the vehicle, the retractor allows pay-out of seat belt webbing 13 to give the occupant a certain amount of freedom of movement. However, if an impact or a potential impact situation is detected, the retractor is locked to prevent pay-out and to secure the occupant in the seat 10. For example, if the vehicle decelerates at a predetermined rate or if the brakes are actuated with a predetermined force then the retractor is locked. Due in part to the free pay-out of the seat belt webbing 13, the seat belt assembly 12 often develops slack during normal operation.

Figure 2:
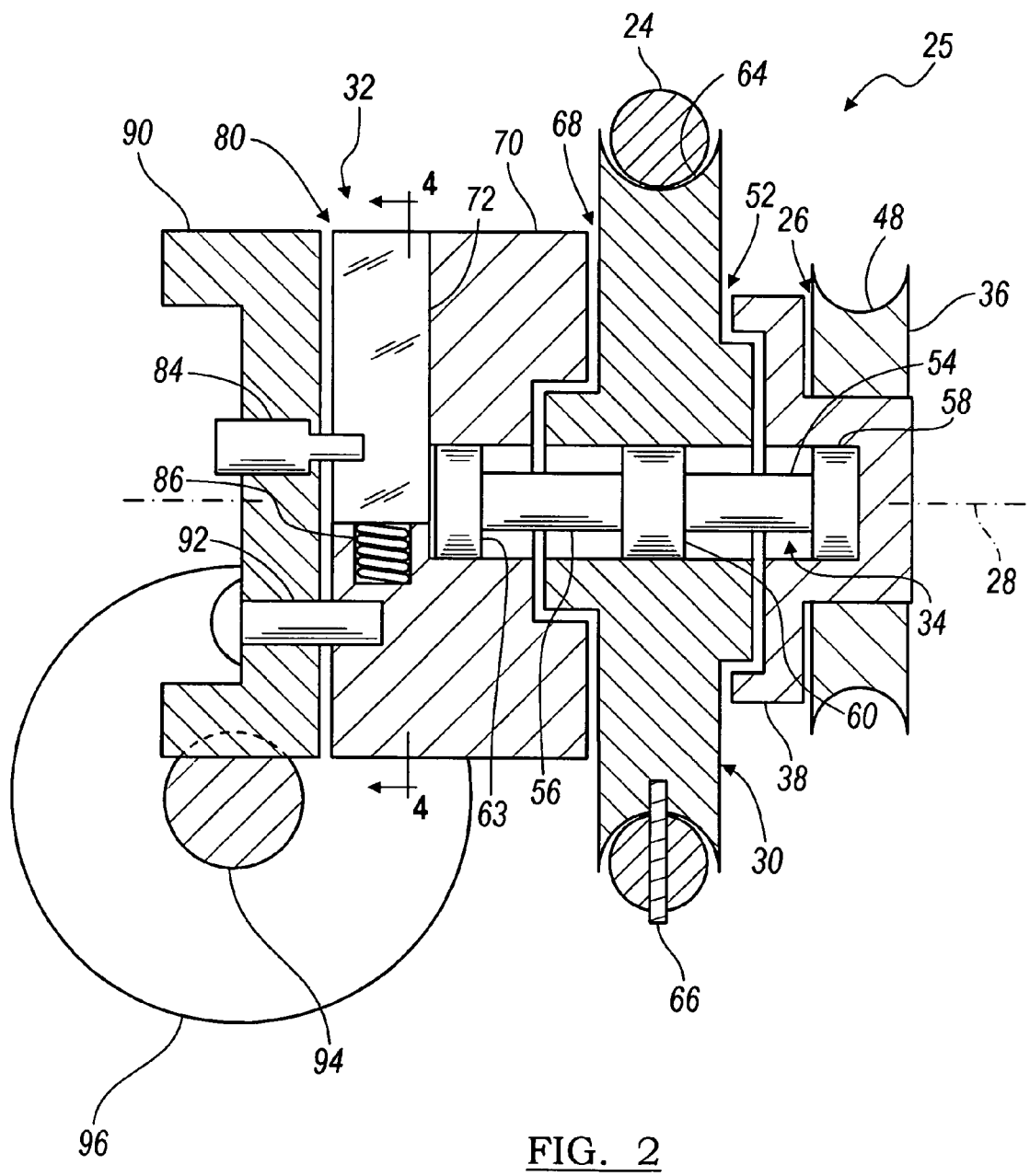
FIG. 2 is a cross-sectional view of an anchorage device embodying the principles of the present invention and being coupled with the seat belt assembly shown in FIG. 1.

Referring to FIG. 2, an anchorage device 25 is coupled with the seat belt buckle cable 24 to reduce slack in the seat belt webbing 13 prior to a vehicle impact. Generally, the anchorage device 25 includes a pretensioning wheel 26 that is rotatably driven about an axis 28, a pulley 30 that is driven by the pretensioning wheel 26 and that is connected to the seat belt buckle cable 24 to retract the seat belt buckle 22, and a locking device 32 to selectively lock or permit rotation of the anchorage device 25 as desired. A torsion bar 34 couples the pretensioning wheel 26, the pulley 30, and the locking device 32 with each other.

Figure 3:
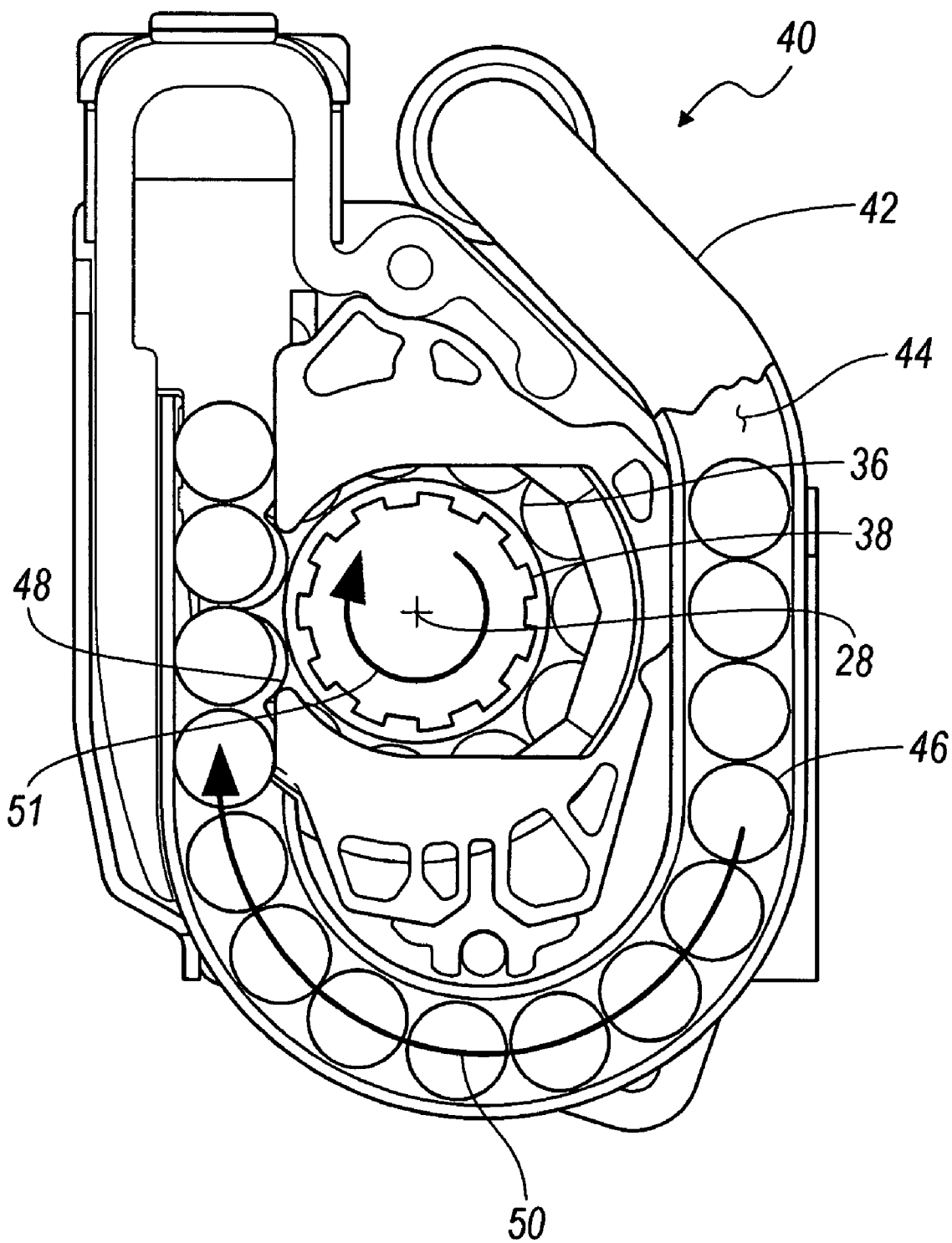
FIG. 3 is a plan view of a pretensioner for the anchorage device shown in FIG. 2.

The pretensioning wheel 26 includes a driven gear 36 and a hub 38 receiving the driven gear 36. As shown in FIG. 3, an input device, such as a pyrotechnic device 40, is able to exert a rotational force onto the driven gear 36 to cause the pretensioning wheel 26 to rotate about the axis 28. The pyrotechnic device 40 includes a tube 42 defining a pressurized chamber 44 containing a plurality of ball bearings 46. Furthermore, the driven gear 36 includes a plurality of bearing seats 48 that are semi-spherical depressions with an appropriate shape and size to receive the ball bearings 46. Therefore, the ball bearings 46 are able to be propelled along an actuating path 50 to rotate the driven gear 36 and the pretensioning wheel 26 in a clockwise direction 51. Prior to activation of the pyrotechnic device 40 the ball bearings 46 are located within the tube 42 at a position such as to avoid engagement with the bearing seats 48, thus allowing the pretensioning wheel 26 to rotate freely. Alternatively, any other appropriate input device may be used with the present invention to rotate the pretensioning wheel 26, such as an input device having linearly-driven elements and/or electrically-driven elements.

Referring back to FIG. 2, the pretensioning wheel 26 and the pulley 30 are preferably separated from each other by a gap 52 so that the respective components 26, 30 do not directly engage each other. However, the pretensioning wheel 26 and the pulley 30 are coupled with each other via the torsion bar 34.

The torsion bar 34 is a dual mode torsion bar, meaning that it has a first torsion segment 54 for transferring a torque between a first pair of components and a second torsion segment 56 for transferring a second torque between a second pair of components. More specifically, as discussed in more detail below, the first torsion segment 54 transfers a first torque between the pretensioning wheel 26 and the pulley 30 and a second torsion segment 56 transfers a second torque between the pulley 30 and the locking device 32.

The first and second torsion segments 54, 56 are each preferably cylindrical members made of a relatively strong material, such as steel or aluminum. Additionally, each of the first and second torsion segments 54, 56 has a particular length and diameter.

The above design specifications for the torsion bar 34 (material type, length, and diameter) may be varied to achieve a desired torsional stiffness and a desired torsional yield limit. For example, a particular torsional stiffness will dictate the extent that the torsion segment is able elastically twist, and therefore the extent that the coupled components are able to rotate with respect to each other. The above design specifications also affect the torsional yield limit of a torsion segment, thereby dictating the torsional load at which the torsion segment will plastically deform and causing the torsion segment to act as a load reducer. For example, during plastic deformation, the torsion segment absorbs energy from the vehicle impact and reduces the load experienced by the vehicle occupant.

The torsion bar 34 includes three connecting portions, a first head 58 that is connected to the pretensioning wheel 26, a second head 60 that is connected to the pulley 30, and a third head 62 that is connected to the locking device 32. The torsion bar 34 shown in the Figures is a single, unitary component, but in an alternative design the torsion segments 54, 56 and the heads 58, 60, 62 are all separate components that are integrally connected with each other. In yet another alternative design, the torsion bar 34 is two separate, unconnected components that operate independently from each other. For example, in this design the first component is connected to the pretensioning wheel 26 and the pulley 30 and the second component is connected to the pulley 30 and the locking device 32. The torsion bar 34 may also include notches, flat spots, or other anti-rotation shapes on the heads 58, 60, 62 to improve the connections with the respective components 26, 30, 32. In yet another alternative design, the torsion bar 34 has a substantially constant diameter along its length.

The outer periphery of the pulley 30 defines a groove 64 that receives the seat belt buckle cable 24 for retraction and advancement of the seat belt buckle 22. For example, the seat belt buckle cable 24 wraps around at least a portion of the outer periphery of the pulley 30 and is fixedly connected to the pulley 30 by a fastening component, such as a connection pin 66 or a crimped ferrule (not shown). Therefore, as the pulley 30 rotates in a clockwise direction the seat belt buckle cable 24 winds around the groove 64 and retracts the seat belt buckle 22. Similarly, as the pulley 30 rotates in a counter-clockwise direction the seat belt buckle cable 24 unwinds from the groove 64 and advances the seat belt buckle 22.

The pulley 30 and the locking device 32 are also preferably separated by a gap 68 so that the respective components 30, 32 do not directly engage each other. However, the pulley 30 and the locking device 32 are coupled with each other via the torsion bar 34, as is described above.

Figure 4:
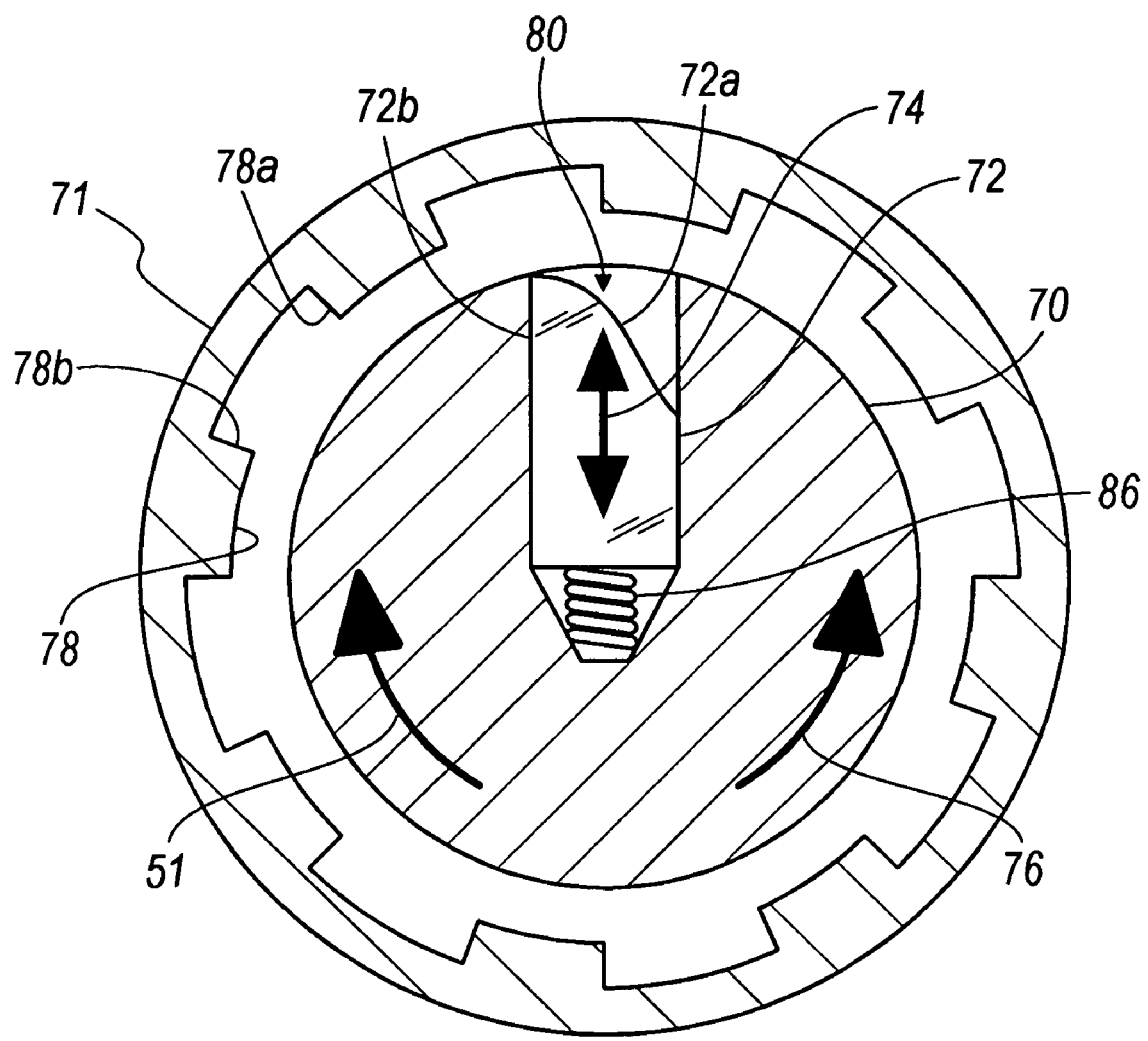
FIG. 4 is a cross-sectional view taken along line 4-4 in FIG. 2 of a locking device of the anchorage device.

The locking device 32 preferably includes a clutch head 70 able to rotate about the axis 28 and a ratcheting portion 72 that is received within the clutch head 70. The ratcheting portion 72 prevents unwanted rotation of the clutch head 70 as desired by selectively locking the locking device 32 with a structural frame 71 (FIG. 4) of the vehicle. For example, the ratcheting portion 72 is a rigid member that is slidably received within a portion of the clutch head 70 so as to be able to travel along a vertical axis 74. The ratcheting portion 72 includes a sloped surface 72a on one side to permit ratcheting in the clockwise direction 51 and a flat surface 72b on the other side to prevent relative movement between the clutch head 70 and the structural frame 71 in the counter-clockwise direction 76. The structural frame 71 of the vehicle includes ridges 78 that cooperate with the ratcheting portion 72 to perform the respective ratcheting and locking functions. More specifically, the ridges 78 include ratcheting edges 78a that are engaged by the sloped surface 72a of the ratcheting portion 72 during the ratcheting function and locking edges 78b that are engaged by the flat surface 72b of the ratcheting portion 72 during the locking function. The ratcheting edges 72a may have a sloped or a flat surface depending on the amount of force desired to ratchet the clutch head 70. The locking edges 78b are preferably flat to engage the flat surface 72b of the ratcheting portion 72 in a flush manner, but any suitable configuration may be used.

Figure 5:
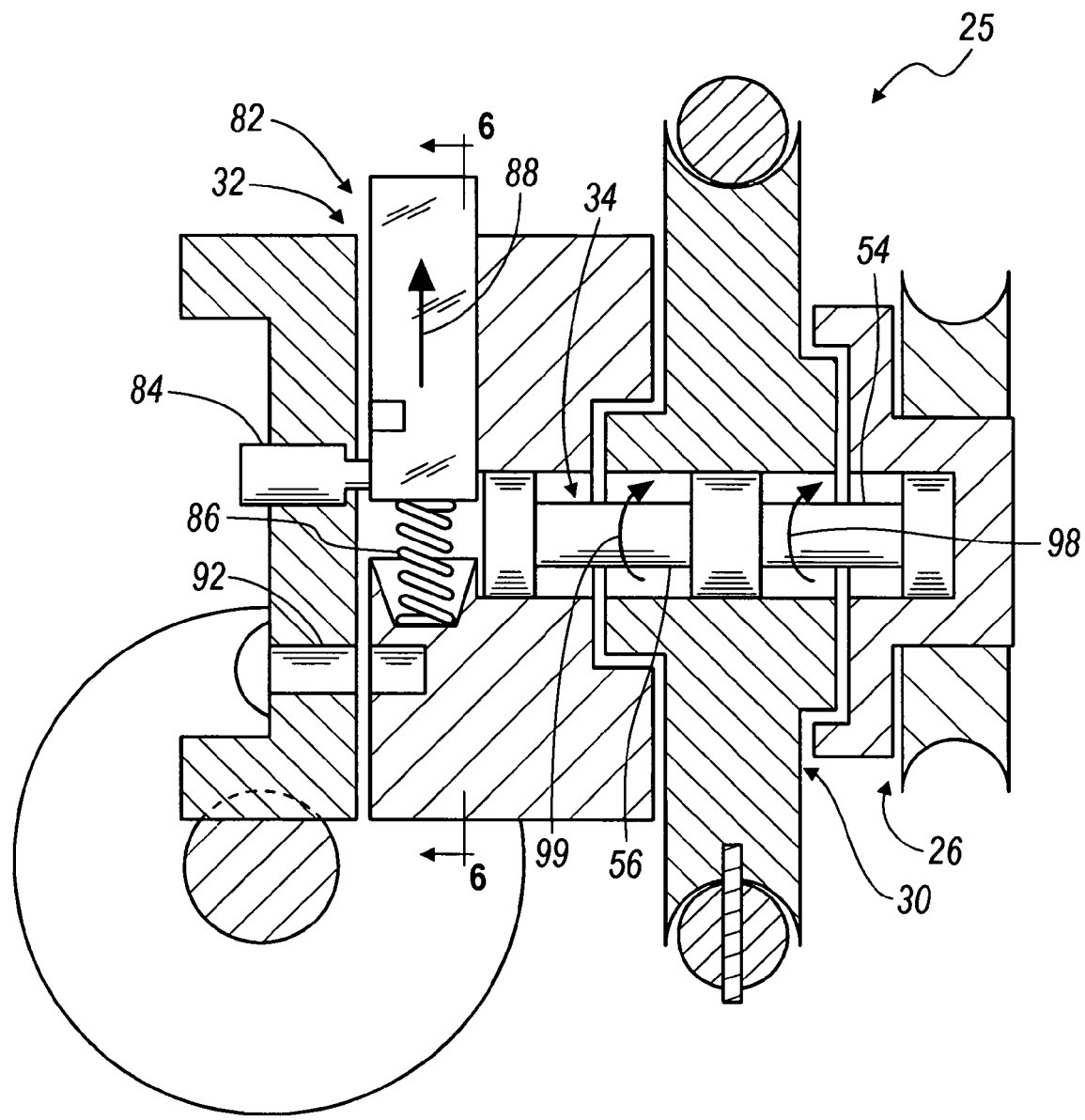
FIG. 5 is a cross-sectional view similar to that in FIG. 2, where the locking device is in an engaged position.
Figure 6:
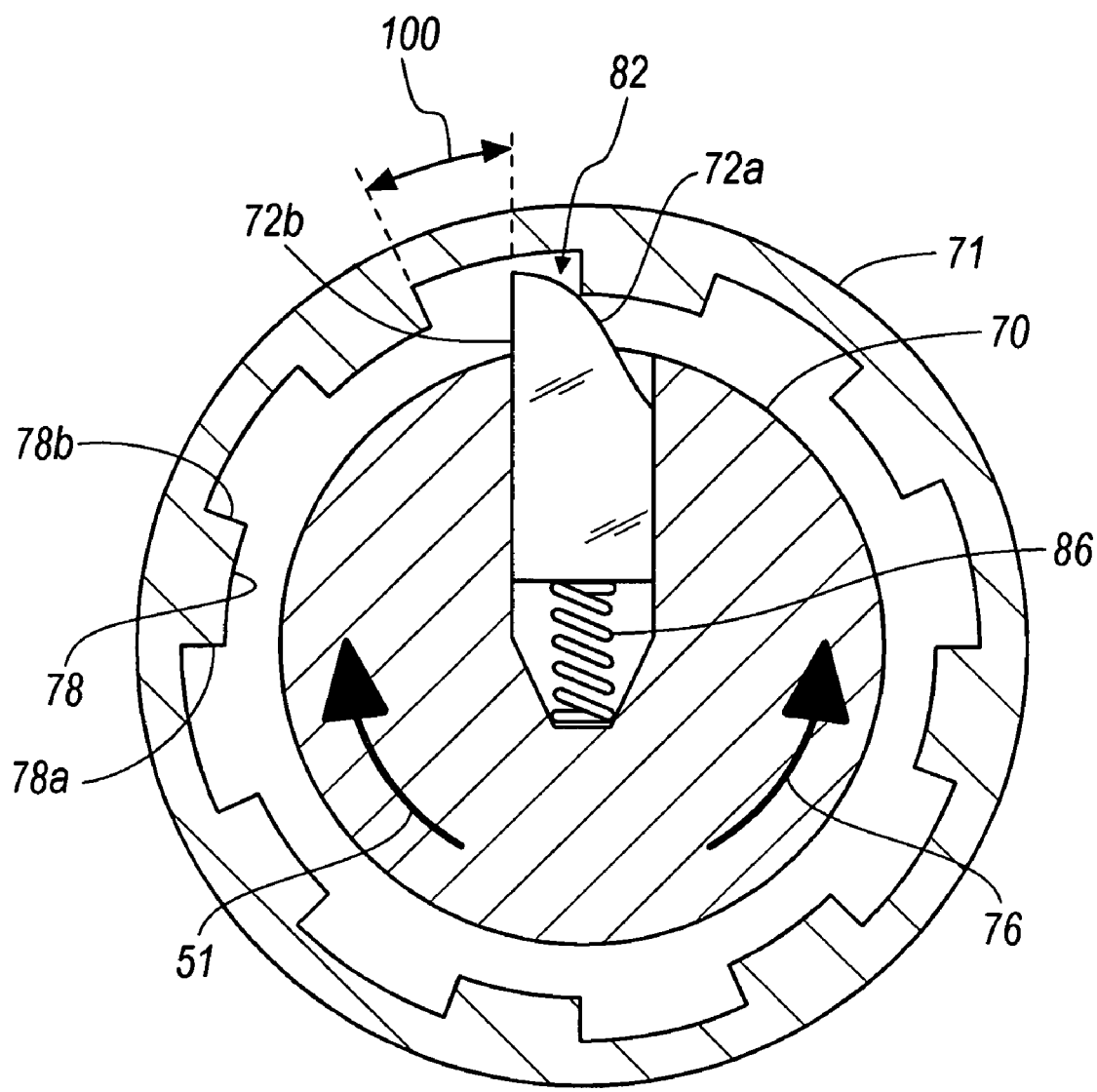
FIG. 6 is a cross-sectional view taken along fine 6-6 in FIG. 5 of a locking device of the anchorage device.

The ratcheting portion 72 has a disengaged position 80 (FIGS. 2 and 4) where the ratcheting portion 72 is completely contained within the clutch head 70 and an engaged position 82 (FIGS. 5 and 6) where the ratcheting portion 72 extends out of the clutch head 70 to contact the structural frame 71. The position of the ratcheting portion 72 is controlled by a first shear pin 84 and a spring 86. For example, the spring 86 urges the ratcheting portion 72 in an upward direction 88 while the first shear pin 84 secures the ratcheting portion 72 in place. When the first shear pin 84 is broken, as discussed in more detail below, the ratcheting portion 72 moves in the upward direction 88 into the engaged position 82. The first shear pin 84 is preferably made from a polymeric plastic material.

The locking device 32 also includes a worm gear 90 that is coupled with the clutch head 70 by a second shear pin 92. The second shear pin 92 is preferably made of metal so the first shear pin 84 shears more easily than the second shear pin 92. The worm gear 90 engages a worm 94 that is driven by a motor 96 for pre-pretensioning of the seat belt buckle cable 24. As is disclosed in "SEATBELT TENSIONING DEVICE AND METHOD", which was filed on Dec. 3, 2004 by the above Assignee AUTOLIV ASP, INC., having Ser. No. 11/004,116, and which is hereby incorporated by reference, pre-pretensioning devices are used to reduce seat belt slack before the actuation of the pyrotechnic device 40. Among other things, pre-pretensioning devices are advantageous because they are able to reduce slack in the seat belt while still being reversible. In other words, in cases where impact does not occur, the motor 96 reverses and the system returns to a normal tensioning level. During the pre-pretensioning, the ball bearings 46 located within the pyrotechnic device 40 are located in a position within the tube 42 such as to avoid engagement with the bearing seats 48. For example, the ball bearings 46 are located in the lower portion of the tube 42 during the pre-pretensioning stage of operation, thus allowing the pretensioning wheel 26 to rotate freely.

Figure 8:
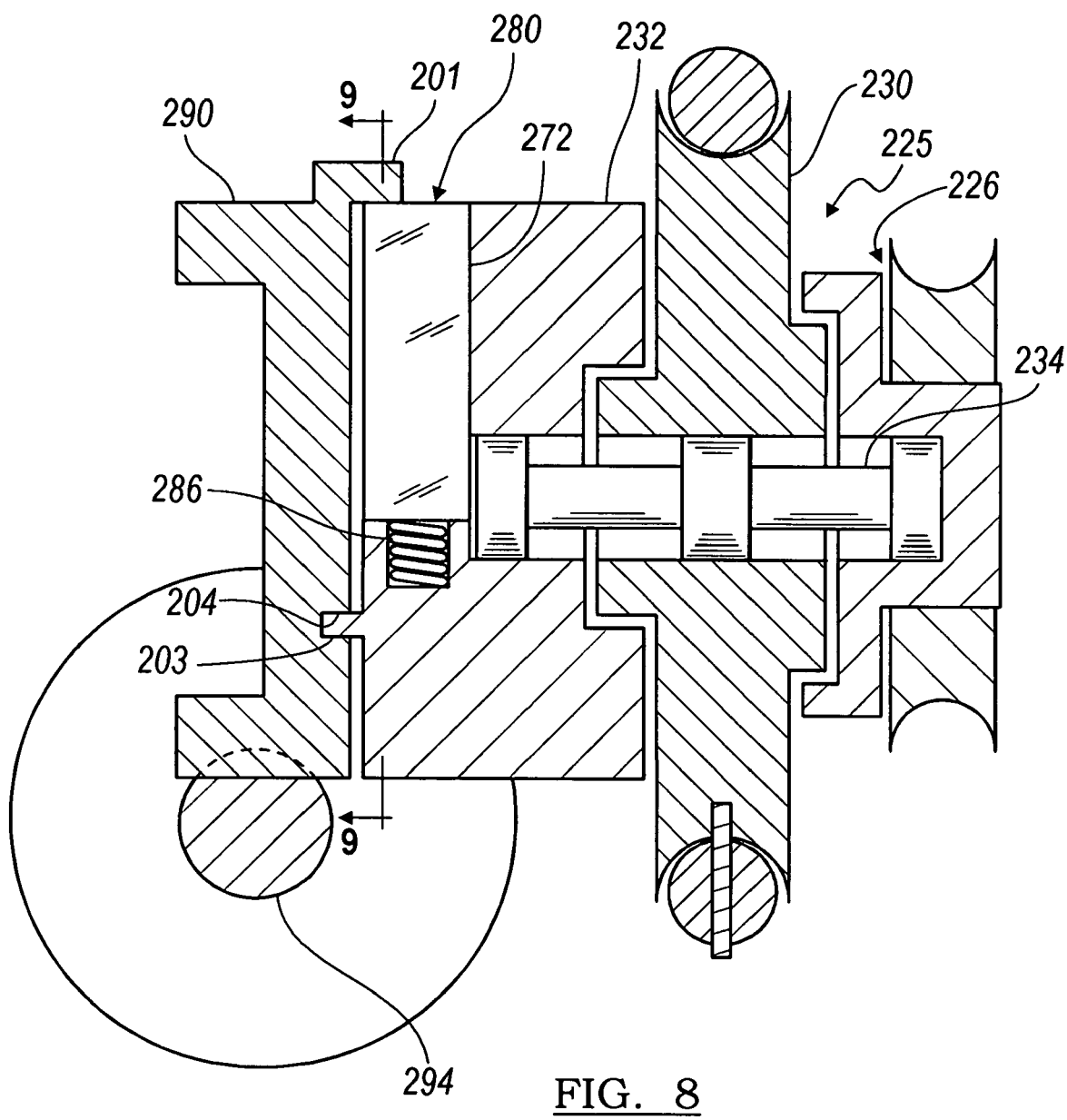
FIG. 8 is cross-sectional view similar to that in FIG. 2 of a yet alternative embodiment of the present invention.
Figure 9:
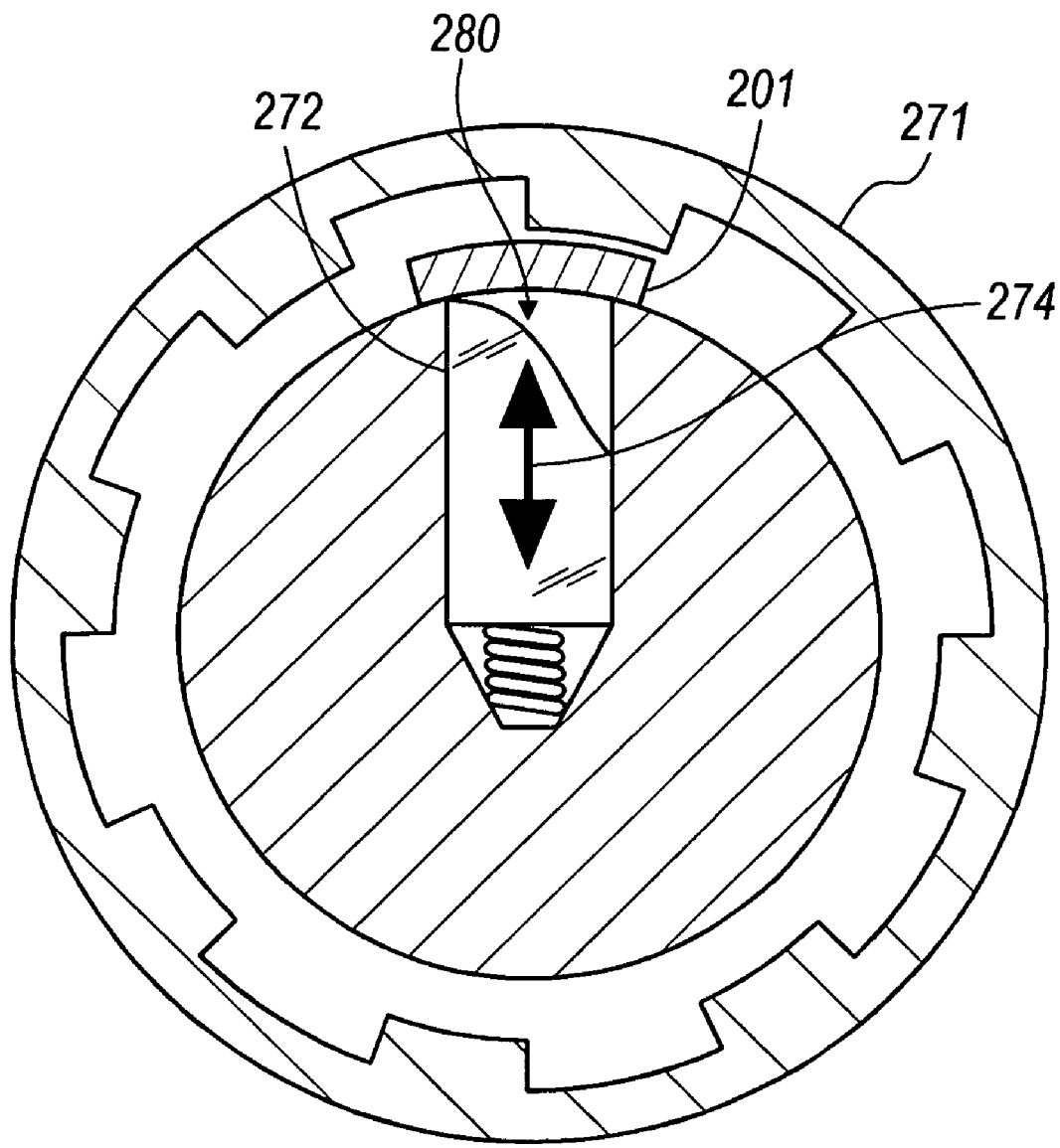
FIG. 9 is a cross-sectional view taken along line 9-9 in FIG. 8 of a locking device of the anchorage device.
Figure 10:
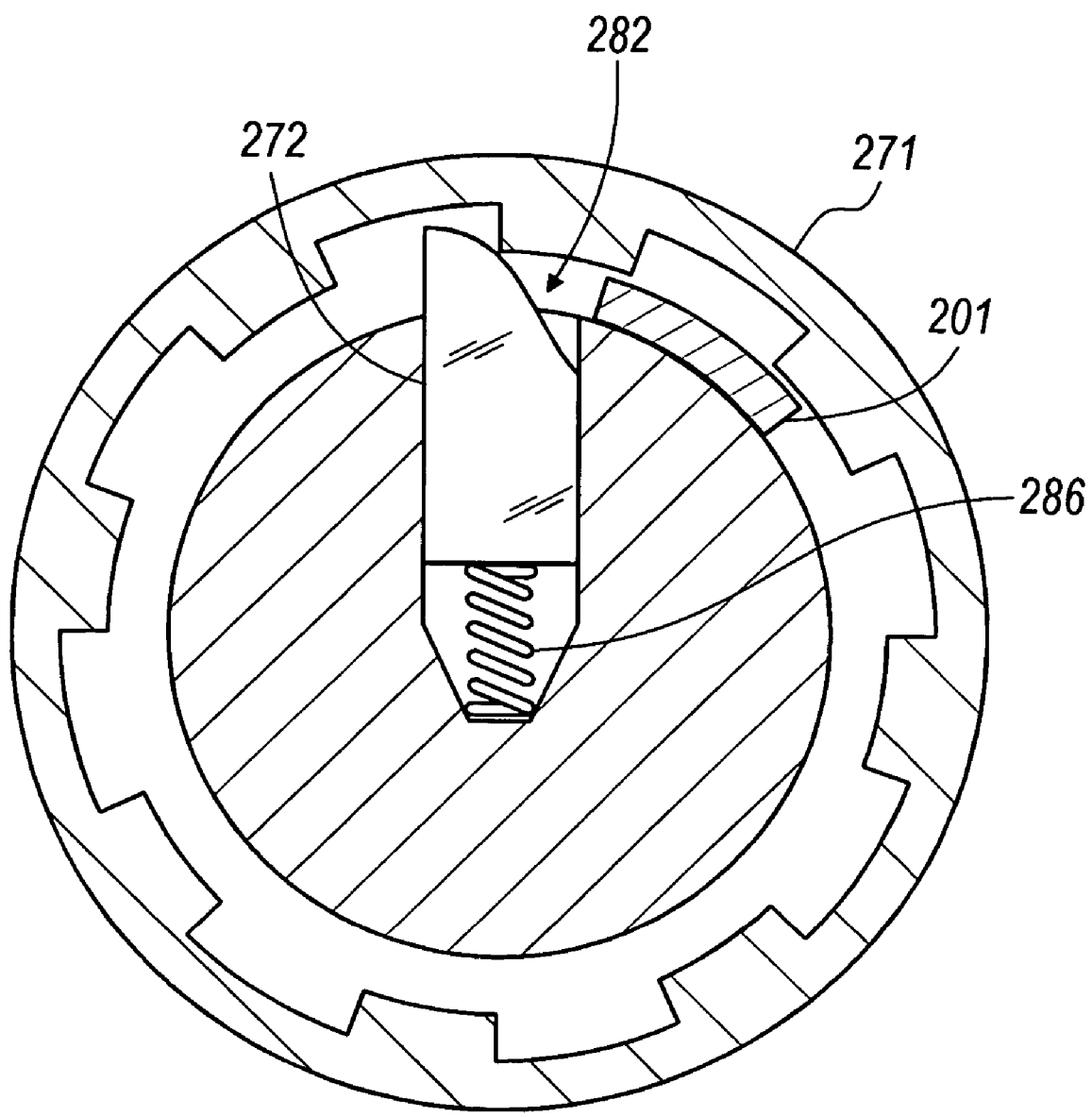
FIG. 10 is a cross-sectional view similar to that in FIG. 9 where the locking device is in an engaged position.

Referring now to FIG. 8, an alternative embodiment of the present invention will now be discussed. The anchorage device 225 shown in FIG. 8 is coupled with an input unit, such as a pyrotechnic device 40 discussed above. Also, the anchorage device 225 includes a pretensioning wheel 226, a pulley 230, and a torsion bar 234 similar to those described above. However, the ratcheting portion 272 of the locking device 232 is held in the disengaged position 280 by a locking protrusion 201 extending from the worm gear 290 rather than by a shear pin. For example, the locking protrusion 201 extends along a top portion of the worm gear 290 and engages a top surface of the ratcheting portion 272 to maintain the compressed state of the spring 286 and prevent the ratcheting portion 272 from engaging the structural frame 271. More specifically, as shown in FIG. 9, the locking protrusion 201 is positioned above the ratcheting portion 272 along the vertical direction 274 when the ratcheting portion 272 is in the disengaged position 280. However, as shown in FIG. 10, when the worm 294 locks and the worm gear 292 and the locking device 232 move relative to each other, the locking protrusion 272 is no longer positioned above the ratcheting portion 272. As a result, the spring 286 urges the ratcheting portion 272 into the engaged position 282 for engagement with the structural frame 271.

Figure 11:
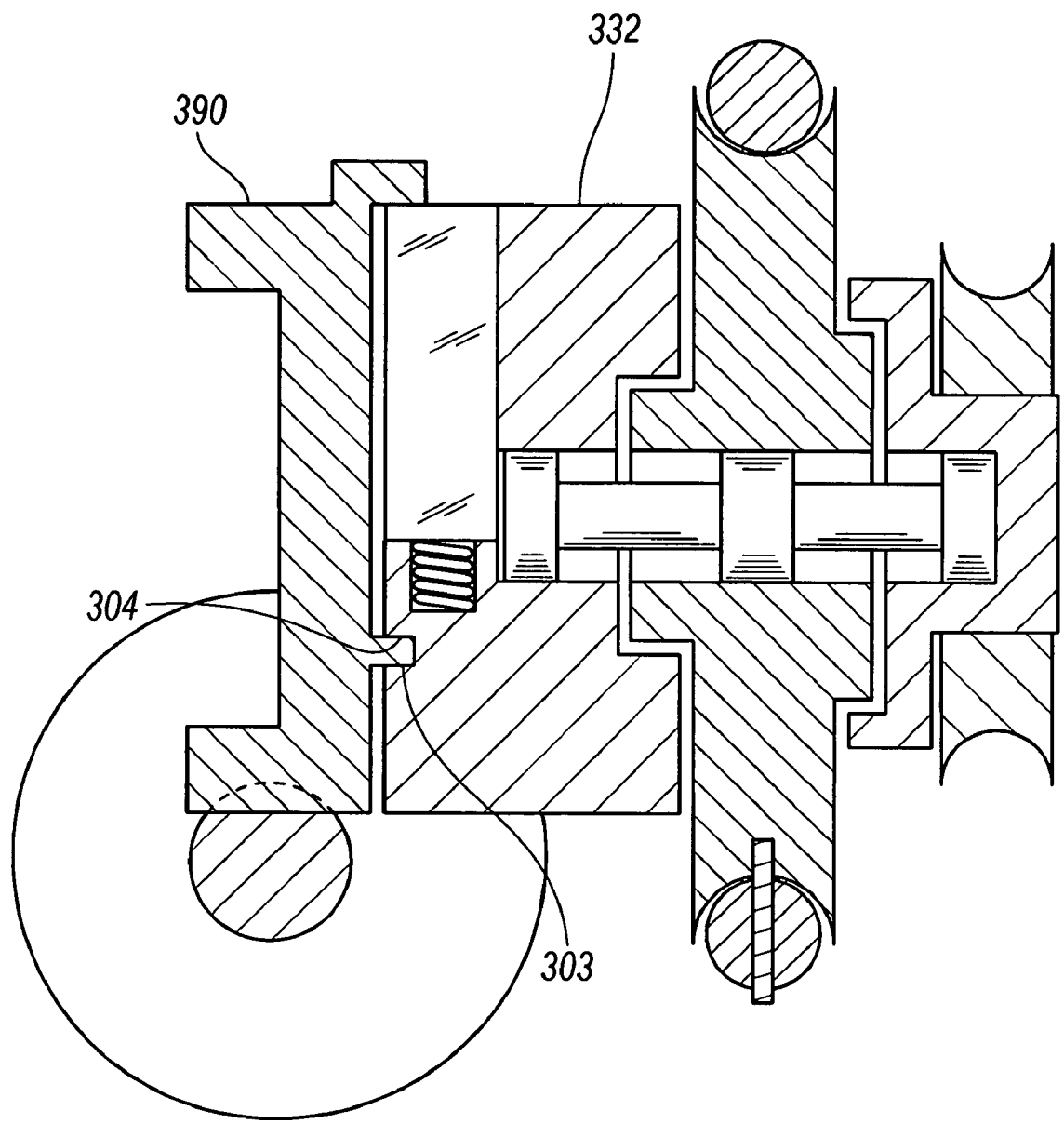
FIG. 11 is cross-sectional view similar to that in FIG. 2 of another alternative embodiment of the present invention.

The locking device 232 in FIG. 8 is selectively coupled to the worm gear 290 by a shear protrusion 203 rather than by a shear pin. For example, the shear protrusion 203 shown in FIG. 8 is a unitary part of the locking device 232 that is received within an opening 204 in the worm gear 290. The shear protrusion 203 therefore acts to selectively couple the locking device 232 and the worm gear 290 when the torque between the respective components is less than a threshold amount, as discussed above with respect to the shear pin. As yet another alternative design, the locking device 332 shown in FIG. 11 is selectively coupled to the worm gear 390 by a shear protrusion 303 extending from the worm gear 390. For example, the shear protrusion 303 shown in FIG. 11 is a unitary part of the worm gear 390 that is received within an opening 304 in the locking device 332. The shear protrusion 303 therefore acts to selectively couple the locking device 332 and the worm gear 390 when the torque between the respective components is less than the threshold amount.

As an additional or an alternative function, the motor 96 may be used for presenting the seat belt buckle 22 to the vehicle occupant. For example, upon the occupant's entry into the vehicle, the motor 96 actuates the worm gear 90 in a direction opposite that described with respect to the pre-pretensioning function of the motor 96. This actuation causes the seat belt buckle cable 24 and the seat belt buckle 22 to move upwards towards the occupant to improve the accessibility of the seat belt buckle 22. During the presentation of the seat belt buckle 22, the ball bearings 46 located within the pyrotechnic device 40 are located in a position within the tube 42 such as to avoid engagement with the bearing seats 48, permitting the pretensioning wheel 26 to rotate freely.

During normal operation of the vehicle, i.e. when a vehicle impact has not been predicted, detected, or experienced, the pyrotechnic device 40 is not actuated and the ratcheting portion 72 is in the disengaged position 80 as shown in FIG. 2.

During a pre-stage of a vehicle impact, when the potential impact is initially predicted, the anchorage device 25 initiates pre-pretensioning. For example, when a potential vehicle impact is predicted via measurements from deceleration sensors (not shown), brake sensors, or other impact detection devices, the motor 96 actuates the locking device 32 in a clockwise direction 51 to pre-pretension the seat belt buckle 22. More specifically, the rotation of the worm gear 90 rotates the clutch head 70 via the second shear pin 92, which in turn rotates the pulley 30 and the pretensioning wheel 26 via the torsion bar 34. As mentioned above, at this point in the operation the pyrotechnic device 40 permits free rotation of the driven gear 36. Therefore, the torque experienced by the first shear pin 84, the second shear pin 92, and the respective torsion segments 54, 56 is typically not strong enough to shear or deform any of these components 54, 56, 84, 92 during the pre-pretensioning stage.

Next, during a first stage of an event, such as an impact event, when an actual vehicle impact or an increased probability of impact is sensed via deceleration sensors (not shown), brake sensors, or other impact detection devices, a rotational force is applied to the pretensioning wheel 26 to retract the seat belt buckle cable 24. For example, the pyrotechnic device 40 actuates the ball bearings 46 and rotates the driven gear 36, which cooperates with the seat belt buckle cable 24 to generate a first torque 98 (FIG. 5) in the first torsion segment 54 of the torsion bar 34. If the first torque 98 is less than the torsional yield limit of the first torsion segment 54, then the pulley 30 will rotate at substantially the same rate as the pretensioning wheel 26. If the first torque 98 is greater than the torsional yield limit of the first torsion segment 54, then the first torsion segment 54 will plastically deform and absorb some of the energy of the first torque 98. Therefore, the first torsion segment 54 acts as a load limiter and prevents excess loads from forming in the seat belt buckle cable 24 and in the seat belt webbing 13. However, the torsional loads acting on the first torsion segment will not typically be enough to plastically deform the torsion bar 34 at this stage of the vehicle impact.

Simultaneously, the rotation of the pulley 30 urges rotation of the second torsion segment 56 and the locking device 32. However, due to the rapid acceleration of the locking device 32, the self-locking characteristic of the mesh between the worm 94 and worm gear 90 prevents rotation of the worm gear 90 and shears the shear pins 92, 84. The resistance of the shear pins 92, 84 generates a second torque 99 in the second torsion segment 56. However, because the shear strength of the shear pins 92, 84 is relatively low, the second torque 99 is typically substantially less than the torsional yield limit of the second torsion segment 56 and no plastic deformation typically occurs at this stage of the vehicle impact.

During the second stage of an event typical seat belt pretensioner devices release the pressure created in the pyrotechnic device 40. For example, as the pressure is released. During this stage the vehicle occupant is urged out of the seat 10 and a force is generated on the seat belt buckle cable 24; thereby causing outward travel of the seat belt buckle cable 24. This outwardly-directed force thereby urges the pulley 30 to rotate in the counter-clockwise direction 76 and to permit pay-out of the seat belt webbing 13. The ratcheting portion 72 engages with one of the ridges 78 to prevent the pay-out, but often this locking function is undesirably delayed due to ratcheting constraints. For example, a gap 100 (FIG. 6) between the flat surface 72b of the locking portion 72 and the locking edge 78b of the ridge 78 permits pay-out of a length of seat belt webbing 13 roughly equal to the length of the gap 100 before the locking components 72b, 78b have engaged each other. As discussed above, the undesirable free pay-out of seat belt webbing 13 is commonly described in the art as "locking dip".

Therefore, to provide and control the resistive force applied to the seat belt webbing 13 before the locking components 72b, 78b have engaged each other, the torsion bar 34 and the pretensioning wheel 26 are utilized to resist counter-clockwise rotation of the pulley 30. For example, the pressure in the pyrotechnic device 40 is substantially maintained during the vehicle impact to prevent or resist movement of the ball bearings 46 and the pretensioning wheel 26 in the counter-clockwise direction 76. In turn, the first torsion segment 54 plastically yields at a known torque to allow rotational movement of the pulley 30, the second torsion bar segment 56, and the locking device 32 until the locking components 72b, 78b have engaged each other, thereby preventing the uncontrolled pay-out of seat belt webbing 13 that would occur if no resistance were offered by the pyrotechnic device 40. In other words, the first torsion segment 54 and the pyrotechnic device 40 cooperate to limit or eliminate locking dip during the time when the ratcheting portion 72 is not yet locked.

During a third stage of the impact, the locking portion 72 engages the structural frame 71 while the forces urging the seat belt buckle cable 24 in the forward direction generate an increased torque in the first and second torsion segments 54, and 56, respectively. If this torque is greater than the combined torsional yield limit of the first torsion segment 54 and second torsion segment 56 then both segments will plastically deform and absorb some of the energy between the vehicle occupant and the seat belt webbing 13. The combined torsional yield limit of the first torsional segment 54 and second torsional segment 56 provides a higher resistive force on the seat belt than either of the segments could provide singularly.

During a fourth stage of the impact, the torsional resistance of the first torsion segment 54 is released. For example, the first torsion segment 54 is designed so as to fracture after a known amount of plastic deformation, thereby decoupling the pulley 30 from the hub 38, the driven gear 36, and the pyrotechnic device 40. At this point the pulley 30 is still coupled to the locking device 32 via the second torsion segment 56. The second torsional segment 56 provides a lower torsional yield limit, and therefore a lower resistive seat belt force, than the previously described combined torsional yield limit. This lower resistive seat belt force continues until sufficient impact energy has been absorbed. The sequential progression from a higher resistive seat belt force to a lower seat belt resistive force is know within the industry as degressive load limiting. The torsion bar can be described as dual mode because it can provide two separate resistive seat belt forces, therefore two separate load limiting levels, a distinct advantage of seat belt load limiting devices.

Figure 7:
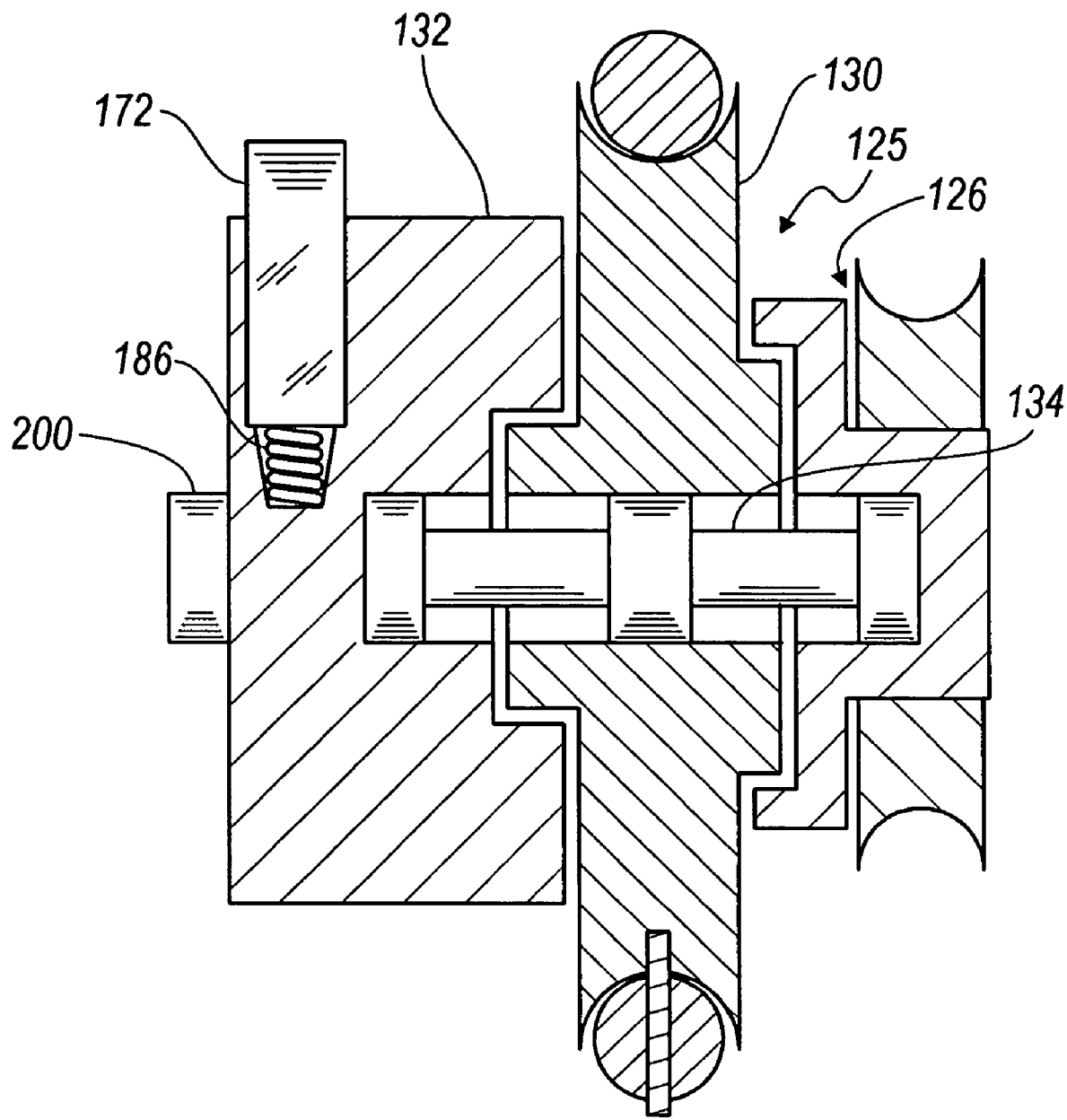
FIG. 7 is cross-sectional view similar to that in FIG. 2 of an alternative embodiment of the present invention.

Referring now to FIG. 7, an alternative embodiment of the present invention will now be discussed. The anchorage device 125 shown in FIG. 7 is coupled with an input unit, such as a pyrotechnic device 40 discussed above. Also, the anchorage device 125 includes a pretensioning wheel 126, a pulley 130, and a torsion bar 134 similar to those described above. However, the anchorage device 125 does not include pre-pretensioning or buckle presentation functions. Thus, the locking device 132 is directly connected to a structural frame (not shown) via a rotating shaft 200. In other words, the anchorage device 125 is not coupled with a motor as in the design shown in FIGS. 2-6. Therefore, the shear pins and the worm gear are also not included in this design. The anchorage device 125 still includes a ratcheting portion 172 as described above. However, because the locking device 132 does not include a reversible pre-pretensioner or a buckle presenter function, the anchorage device 125 does not need to rotate freely in the counter-clockwise direction. Therefore, the ratcheting portion 172 is able to be permanently positioned in the engaged position.

It is therefore intended that the foregoing detailed description be regarded as illustrative rather than limiting, and that it be understood that it is the following claims, including all equivalents, that are intended to define the spirit and scope of this invention.

What is claimed is:

1. An anchorage device for tensioning a vehicle seat belt, the anchorage device comprising:
   a pretensioning wheel configured to rotate about an axis;
   a torsion bar having a first portion coupled to the pretensioning wheel;
   a pulley coupled with a second portion of the torsion bar and configured to rotate about the axis based on the rotation of the pretensioning wheel;
   a seat belt connecting member coupled with the pulley such as to be tensioned based on the rotation of the pulley; and
   a locking device coupled with a third portion of the torsion bar such that the locking device is configured to rotate about the axis based on the rotation of the pulley, wherein the locking device includes a locking portion configured to selectively prevent rotation of the locking device.

2. An anchorage device as in claim 1, wherein the torsion bar is a single, unitary component.

3. An anchorage device as in claim 2, wherein the first portion has a torsional yield limit.

4. An anchorage device as in claim 3, wherein the second portion has a second torsional yield limit less than the torsional yield limit of the first portion.

5. An anchorage device as in claim 1, wherein the seat belt connecting member is connected to a seat belt buckle.

6. An anchorage device as in claim 1, wherein the seat belt connecting member is connected to an anchor end of the seat belt.

7. An anchorage device as in claim 1, wherein the locking device includes at least one ratcheting mechanism configured to permit the rotation of the locking device in a first direction and to prevent the rotation of the locking device in a second direction.

8. An anchorage device as in claim 7, wherein the at least one ratcheting mechanism has an engaged position to prevent the rotation of the locking device in the second direction and a disengaged position to permit the rotation of the locking device in the second direction.

9. An anchorage device as in claim 8, wherein the at least one ratcheting mechanism is maintained in the disengaged position by a shear pin.

10. An anchorage device as in claim 8, wherein the at least one ratcheting mechanism is maintained in the disengaged position by a locking protrusion configured to selectively engage an upper surface of the ratcheting mechanism.

11. An anchorage device as in claim 9, further comprising an electric motor, a worm, and a worm gear coupling the electric motor and the locking device.

12. An anchorage device as in claim 11, wherein the worm gear and the locking device are coupled with each other via a second shear pin.

13. An anchorage device as in claim 11, further comprising a shear protrusion configured to selectively couple the worm gear and the locking device with each other, wherein the worm gear and the shear protrusion define a single, unitary part.

14. An anchorage device for tensioning a vehicle seat belt, the anchorage device comprising:
   a pretensioning wheel configured to rotate about an axis based on input from an input device;
   a pulley coupled with a seat belt connecting member;
   a first load limiting component to prevent a predetermined maximum first torque between the pretensioning wheel and the pulley;
   a locking device including a locking portion configured to selectively prevent rotation of the locking device; and
   a second load limiting component to prevent a predetermined maximum second torque between the locking device and the pulley.

15. An anchorage device as in claim 14, wherein the first load limiting component and the second load limiting component cooperate to define a dual mode torsion bar.

16. An anchorage device as in claim 14, wherein the seat belt connecting member is connected to a seat belt buckle.

17. An anchorage device as in claim 14, wherein the seat belt connecting member is connected to an anchor end of a seat belt.

18. A method of tensioning a vehicle seat belt, the method comprising:
   coupling a pretensioning wheel and a seat belt connecting member via a first portion of a torsion bar;
   coupling the seat belt connecting member and a locking device via a second portion of the torsion bar;
   applying a rotational force to the pretensioning wheel during a first stage of an event to retract the seat belt connecting member; and
   providing resistance to rotation of the pulley via the first portion of the torsion bar during a second stage of the event.

19. A method as in claim 18, wherein the first stage of the event is pretensioning of the seat belt connecting member.

20. A method as in claim 19, wherein the second stage of the event is outward locking travel of the seat belt connecting member.

21. A method as in claim 20, wherein the first portion of the torsion bar plastically yields during the first stage of the event.

22. A method as in claim 18, further comprising engaging the locking device to substantially prevent the locking device from rotating.

23. A method as in claim 18, further comprising engaging a ratcheting mechanism of the locking device during a third stage of the event to permit the rotation of the locking device in a first direction and to prevent the rotation of the locking device in a second direction via the second portion of the torsion bar.

24. A method as in claim 23, further comprising releasing the resistance to the rotation of the pulley by the first portion of the torsion bar during a fourth stage of the event.

25. A method as in claim 24, further comprising preventing the rotation of the locking device in the second direction via the second portion of the torsion bar during the fourth stage of the event.

26. A method as in claim 18, further comprising substantially maintaining the rotational force to the pretensioning wheel during the second stage of the event.

* * * * *